[19] United States Patent
Epstein

[11] 4,398,440
[45] Aug. 16, 1983

[54] WORKPIECE MOUNTING DEVICE FOR CUTTING A CIRCLE

[76] Inventor: Harry Epstein, 687 Kildare Crescent, Seaford, N.Y. 11783

[21] Appl. No.: 253,067

[22] Filed: Apr. 10, 1981

[51] Int. Cl.³ .......................... B27B 5/00; B27B 9/04
[52] U.S. Cl. .................................... 83/439; 83/411 R
[58] Field of Search ................ 83/439, 411 R, 733; 269/57

[56] References Cited

U.S. PATENT DOCUMENTS

| | | | |
|---|---|---|---|
| 2,535,673 | 12/1950 | Forbes | 83/411 R |
| 2,696,230 | 12/1954 | Libby | 83/439 |
| 2,720,897 | 10/1955 | Kairath | 83/439 |
| 2,766,784 | 10/1956 | Antczak | 83/439 X |
| 3,995,521 | 12/1976 | Raphael | 83/439 X |
| 4,027,566 | 6/1977 | Harrill | 83/439 X |
| 4,047,458 | 9/1977 | Hall | 83/439 |
| 4,244,253 | 1/1981 | Flanigan | 83/439 |
| 4,275,777 | 6/1981 | Briggs | 83/439 X |

Primary Examiner—James M. Meister
Attorney, Agent, or Firm—Lackenbach, Siegel, Marzullo, Presta & Aronson

[57] ABSTRACT

A guide member has a linearly extending guide groove formed therein. A pivot pin is guided in the guide groove in perpendicular relation with the guide member and is releasably securable to the guide member at a selected point of the guide groove. A mounting clamp releasably secures the guide member to the miter groove of the table of a motor-driven saw blade in a manner whereby the guide member abuts the planar work surface of the table with the guide groove perpendicular to the miter groove and the pivot pin extending perpendicularly to the work surface at a selected distance from the saw blade, so that a workpiece rotatably mounted on the pivot pin and parallel to the work surface is cut in a circle by the saw blade as the workpiece is rotated, the diameter of the circle being twice the distance of the pivot pin from the saw blade.

7 Claims, 13 Drawing Figures

U.S. Patent  Aug. 16, 1983  Sheet 1 of 3  4,398,440
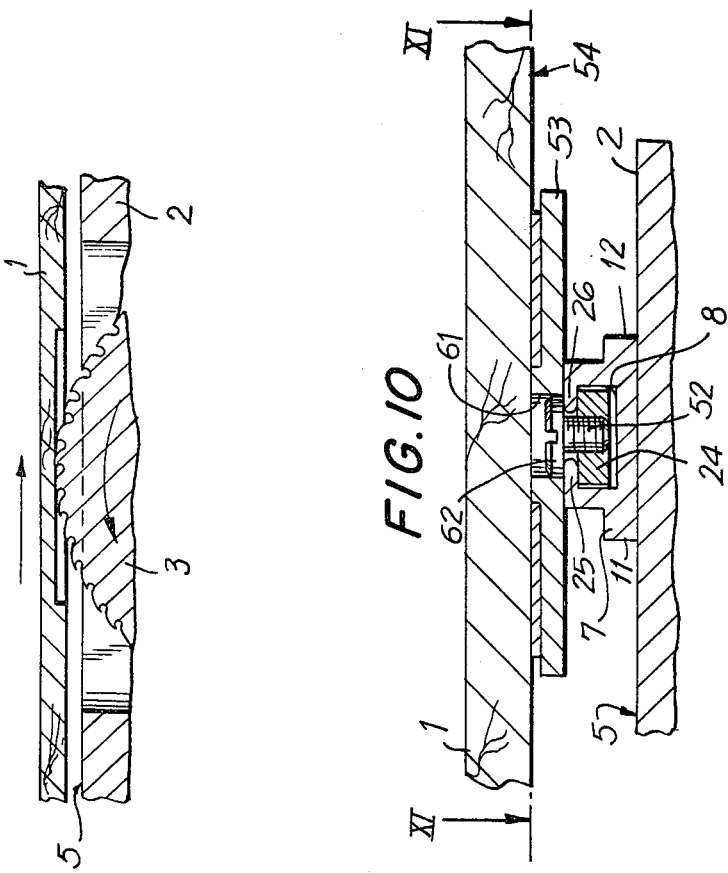
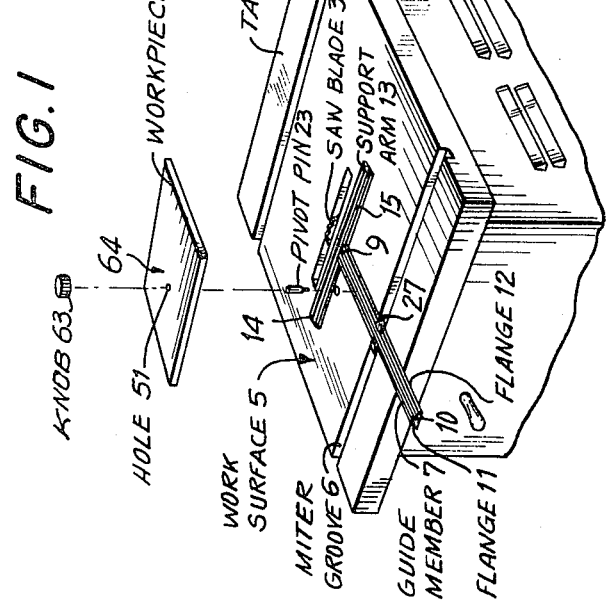
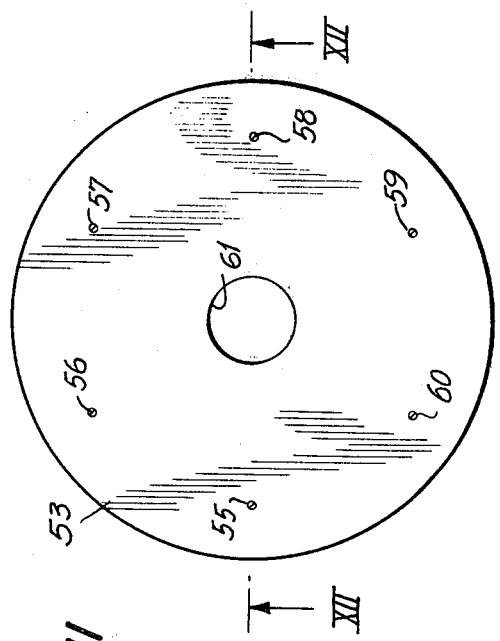

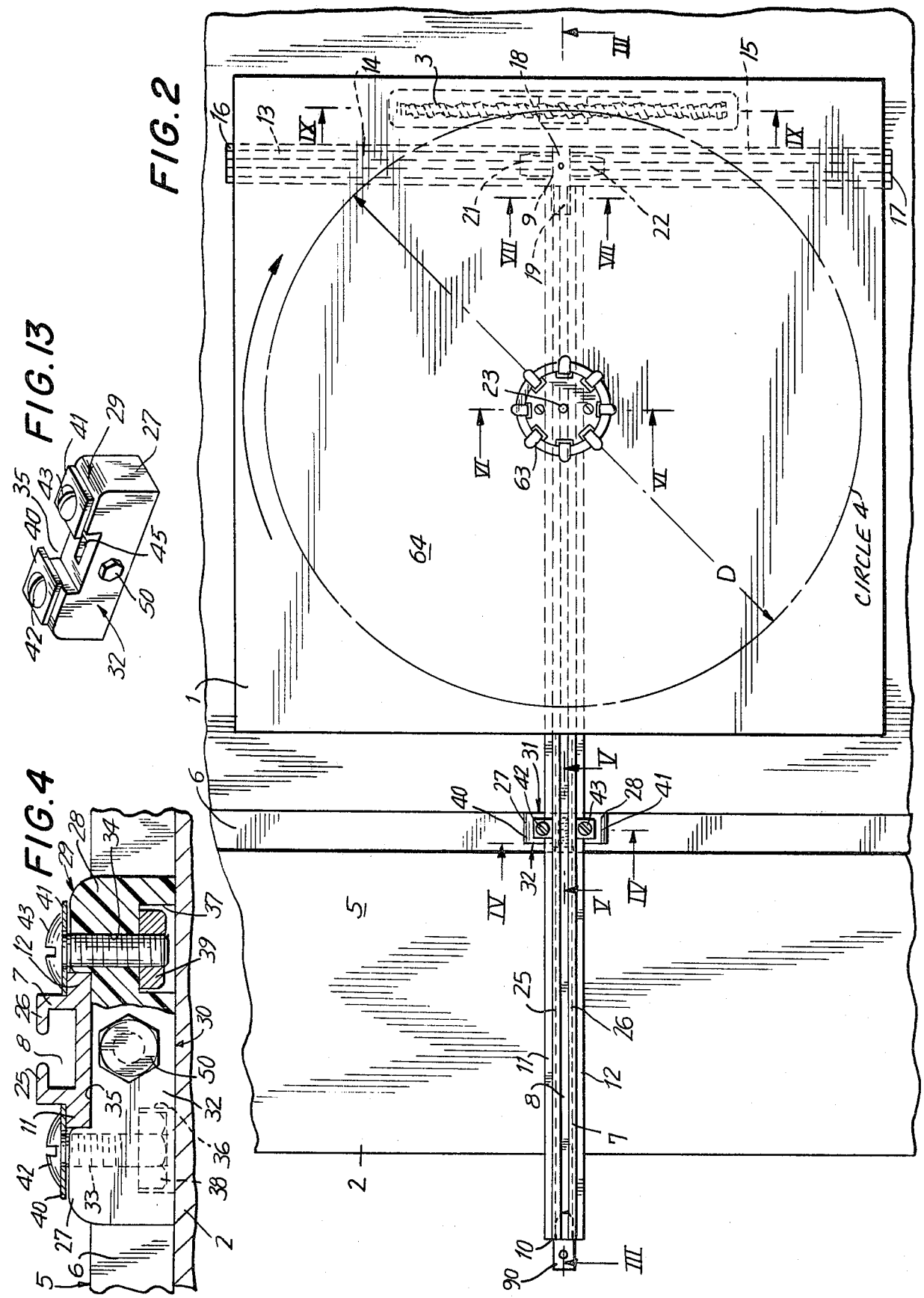

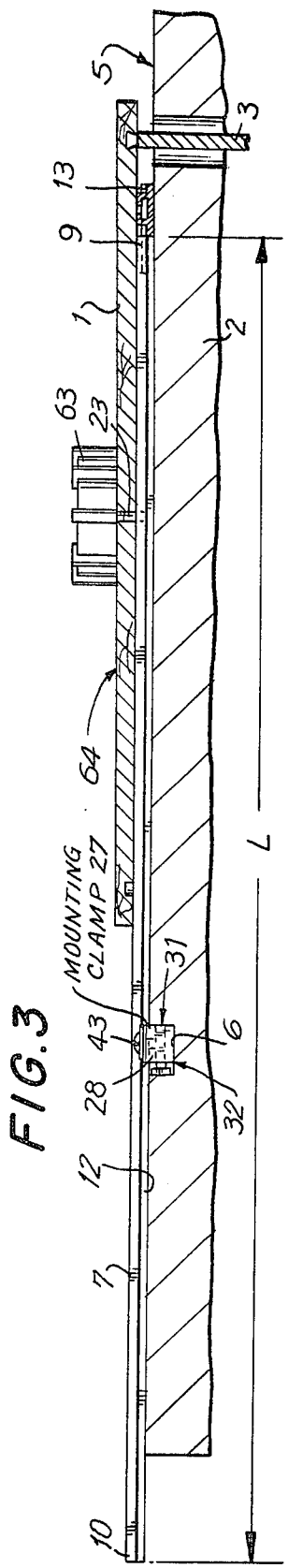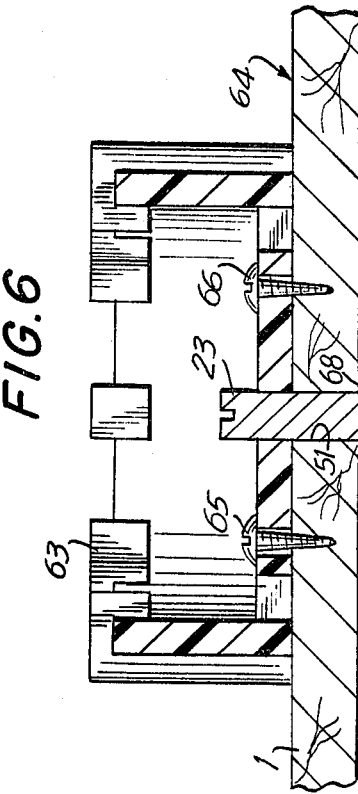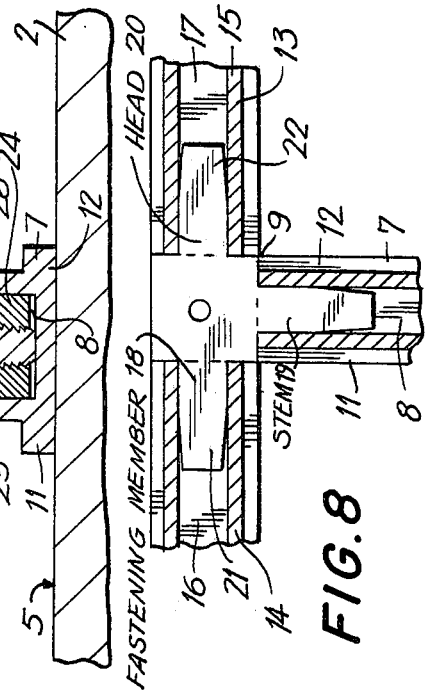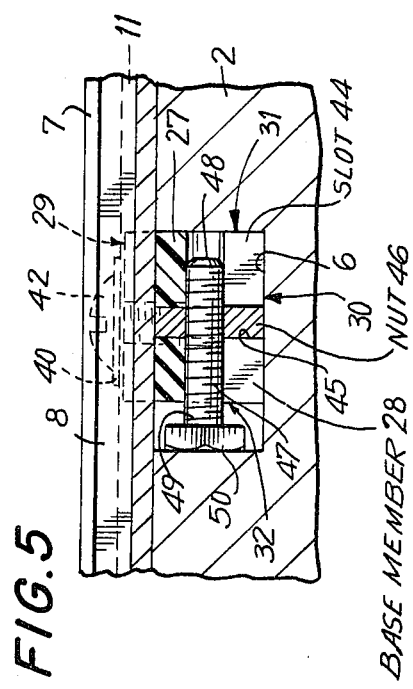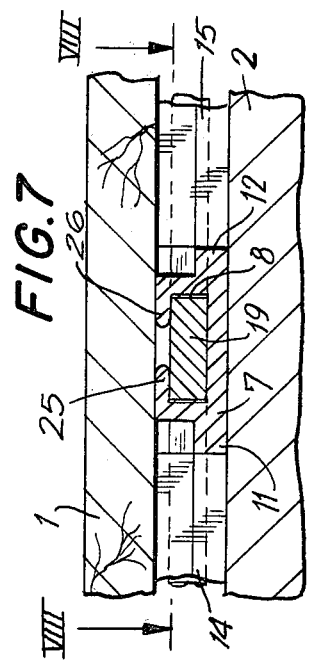

WORKPIECE MOUNTING DEVICE FOR CUTTING A CIRCLE

BACKGROUND OF THE INVENTION

The present invention relates to a workpiece mounting device for cutting a circle. More particularly, the invention relates to a device for mounting a workpiece on the table of a motor-driven saw blade to cut a circle of a selected diameter in the workpiece.

The principal object of the invention is to provide a workpiece mounting device, which is inexpensive in manufacture, for cutting a circle.

An object of the invention is to provide a workpiece mounting device of simple structure, which is used with facility, convenience, ease and rapidity, for cutting a circle of any desired diameter.

Another object of the invention is to provide a workpiece mounting device for cutting a perfect circle, which device is assembled and disassembled with facility, convenience, ease and rapidity.

Still another object of the invention is to provide a workpiece mounting device, which is mounted on, and removed from, the table of a motor-driven saw blade with facility, convenience and rapidity and without damage to the table, and functions efficiently, effectively and reliably to cut a perfect circle of a desired diameter in the workpiece.

Yet another object of the invention is to provide a workpiece mounting device of simple structure, which is inexpensive in manufacture, used with facility, convenience, ease and rapidity, assembled and disassembled with facility, convenience, ease and rapidity, mountable on and removable from, the table of a motor-driven saw blade with facility, convenience and rapidity and without danger of injury to the hands of the user, without damage to the table, and functions efficiently, effectively and reliably to cut a perfect circle of any desired diameter in the workpiece.

BRIEF SUMMARY OF THE INVENTION

In accordance with the invention, a device for mounting a workpiece on the table of a motor-driven saw blade to cut a circle of a selected diameter in the workpiece, said table having a planar work surface with a miter groove formed therein and said saw blade being mounted in operative proximity with said work surface in spaced relation with said miter groove, comprises a guide member having a linearly extending guide groove formed therein. A pivot pin is guided in the guide groove in substantially perpendicular relation with the guide member and is releasably securable to the guide member at a selected point of the guide groove. A mounting clamp releasably secures the guide member to the miter groove of the table of a motor-driven saw blade in a manner whereby the guide member abuts the planar work surface of the table with the guide groove substantially perpendicular to the miter groove and the pivot pin extending substantially perpendicularly to the work surface at a selected distance from the saw blade, so that a workpiece rotatably mounted on the pivot pin, substantially parallel to the work surface, is cut in a circle by the saw blade as the workpiece is rotated, the diameter of the circle being twice the distance of the pivot pin from the saw blade.

The guide member has a length and flanges extending along its length. The mounting clamp comprises a base member accommodated in the miter groove and having a securing device for releasably securing the base member in the miter groove and a clamping device for releasably clamping the flanges of the guide member.

The base member of the mounting clamp is of substantially rectangular parallelepiped configuration having spaced substantially parallel first and second surfaces and spaced substantially parallel third and fourth surfaces substantially perpendicular to the first and second surfaces. The clamping device comprises a pair of spaced substantially parallel bores formed through the base member from the first to the second surface and substantially perpendicular thereto. A mounting groove is formed in the first surface between the bores. A pair of nut holes are formed in the second surface at the bores. A pair of nuts are seated in the nut holes. Each of a pair of screws passes through a corresponding one of a pair of square washers as the first surface and through a corresponding one of the bores and is threadedly coupled to a corresponding one of the nuts, whereby the square washers clamp the flanges and are releasably tightenable via the screws.

The base member of the mounting clamp is of substantially rectangular parallelepiped configuration having spaced substantially parallel first and second surfaces and spaced substantially parallel third and fourth surfaces substantially perpendicular to the first and second surfaces. The clamping device is mounted on the first surface. The securing device comprises a slot formed through the base member from the third to the fourth surface and opening at the second surface. A square nut hole is formed in the base member substantially coaxially with the slot at substantially the center thereof and opening at the first and second surfaces. A square nut is seated in the square nut hole and a securing screw passes through a slot. The securing screw is threadedly coupled to the square nut and has a shank with spaced opposite first and second ends and a head at the second end of the shank at the fourth surface of the base member. The first end of the shank is at the third surface of the base member whereby adjustment of the securing screw secures the base member in the miter groove.

The guide member has spaced opposite first and second ends and a support arm at the first end thereof extending substantially perpendicularly to the guide groove.

The support arm of the guide member has first and second identical parts with linearly extending grooves formed therein. A substantially T-shaped fastening member has a stem removably seated in the guide groove at the first end of the guide member and a head extending substantially perpendicularly to the stem and having a first half extending from one side of the stem and removably seated in the groove of the first part of the support arm and a second half extending from the opposite side of the stem and removably seated in the groove of the second part of the support arm.

A small-altitude cylindrical rotary member has an axial hole formed therethrough and is affixed to the undersurface of the workpiece whereby the hole through the rotary member accommodates the pivot pin.

A knob is coaxially affixed to the oversurface of the workpiece whereby the workpiece is manually rotatable at a distance from the saw blade via the knob.

BRIEF DESCRIPTION OF THE DRAWINGS

In order that the invention may be readily carried into effect, it will now be described with reference to the accompanying drawings, wherein:

FIG. 1 is a perspective view of an embodiment of the workpiece mounting device of the invention, mounted on the table of a saw blade;

FIG. 2 is a top plan view, on an enlarged scale, of the embodiment of FIG. 1, mounted on the table of a saw blade and having a workpiece mounted thereon;

FIG. 3 is a sectional view, taken along the lines III—III of FIG. 2;

FIG. 4 is a view, on an enlarged scale, partly cut away and partly in section, taken along the lines IV—IV, of FIG. 2;

FIG. 5 is a sectional view, on an enlarged scale, taken along the lines V—V, of FIG. 2;

FIG. 6 is a sectional view, on an enlarged scale, taken along the lines VI—VI, of FIG. 2;

FIG. 7 is a sectional view, on an enlarged scale, taken along the lines VII—VII, of FIG. 2;

FIG. 8 is a view, on a reduced scale, partly in section, taken along the lines VIII—VIII, of FIG. 7;

FIG. 9 is a sectional view, taken along the lines IX—IX, of FIG. 2;

FIG. 10 is a view, on an enlarged scale, partly in section, of another embodiment of the workpiece mounting device of the invention, mounted on the table of a saw blade and having a workpiece mounted thereon;

FIG. 11 is a view, on an enlarged scale, taken along the lines XI—XI, of FIG. 10;

FIG. 12 is a sectional view, taken along the lines XII—XII, of FIG. 11; and

FIG. 13 is a perspective view, on an enlarged scale, of the embodiment of FIG. 2 of the mounting clamp of the workpiece mounting device of the invention.

DETAILED DESCRIPTION OF THE INVENTION

The device of the invention mounts a workpiece 1 (FIGS. 1 to 3, 6, 7, 9 and 10) on the table 2 (FIGS. 1 to 7, 9 and 10) of a motor-driven saw blade 3 (FIGS. 1 to 3 and 9) to cut a circle 4 (FIG. 2) of a selected diameter D (FIG. 2) in said workpiece. The table 2 has a planar work surface 5 (FIGS. 1 to 4, 6, 9 and 10) with a miter groove 6 formed therein, as shown in FIGS. 1 to 5. The saw blade 3 is mounted in operative proximity with the work surface 5, as shown in FIGS. 1 to 3 and 9, and in spaced relation with the miter groove 6, as shown in FIGS. 1 to 3.

A guide member 7 (FIGS. 1 to 8 and 10) has a linearly extending guide groove 8 formed therein (FIGS. 2, 4 to 8 and 10). The guide member 7 has a length L (FIG. 3) extending between spaced opposite first and second ends 9 and 10, respectively (FIGS. 1 to 3), and flanges 11 and 12 extending along its length between said ends (FIGS. 1, 2, 4, 6 to 8 and 10).

A support arm 13 is provided at the first end 9 of the guide member 7 and extends substantially perpendicularly to the guide groove 8, as shown in FIGS. 1 to 3 and 8. The support arm 13 of the guide member 7 may be a unitary member, removably affixed to the first end 9 of the guide member, by any suitable means, but preferably has first and second identical parts 14 and 15 (FIGS. 1, 2, 7 and 8) with linearly extending grooves 16 and 17, respectively, formed therein (FIGS. 2, 7 and 8).

A substantially T-shaped fastening member 18 (FIG. 8) has a stem 19 (FIG. 8) removably seated in the guide groove 8 at the first end 9 of the guide member 7, as shown in FIG. 8, and a head 20 extending substantially perpendicularly to said stem (FIG. 8). The head 20 of the fastening member 18 has a first half 21 extending from one side of the stem 19 and removably seated in the groove 16 of the first part 14 of the support arm 13, and a second half 22 extending from the opposite side of said stem and removably seated in the groove 17 of the second part 15 of said support arm, as shown in FIG. 8.

A pivot pin 23 is guided in the guide groove 8 of the guide member 7 in substantially perpendicular relation with said guide member, as shown in FIGS. 1 to 3 and 6. The pivot pin 23 is releasably securable to the guide member 7 at a selected point of the guide groove 8. This is accomplished by any suitable means such as, for example, a nut 24 (FIG. 6). The pivot pin 23 has a threaded end threadedly coupled to the nut 24, as shown in FIG. 6. When the pivot pin 23 is loosely coupled to the nut 24, said pin and said nut are freely slidable along the entire length L of the guide member 7. The nut 24 is retained in the guide groove 8 by overhanging lips 25 and 26 of the guide member 7 (FIGS. 2, 4, 6, 7 and 10). When the pivot pin 23 is tightly coupled to the nut 24, said pin and said nut clamp the lips 25 and 26 and said pin is retained in position, until it is loosened in said nut.

A mounting clamp 27 (FIGS. 1 to 5 and 13) releasably secures the guide member 7 to the miter groove 6 of the table 2 of the motor-driven saw blade 3, as shown in FIGS. 1 to 3 and 5. This is accomplished in a manner whereby the guide member 7 abuts the planar work surface 5 of the table 2, as shown in FIGS. 1 and 3, with the guide groove 8 substantially perpendicular to the miter groove 6 (FIGS. 1 and 2) and the pivot pin 23 extending substantially perpendicularly to said work surface at a selected distance from the saw blade 3, as shown in FIGS. 1 to 3. Thus, a workpiece 1 rotatably mounted on the pivot pin 23, substantially parallel to the work surface 5 (FIGS. 2, 3 and 6), is cut in a circle 4 by the saw blade 3, as said workpiece is rotated (FIG. 2). The diameter of the circle 4 is twice the distance of the pivot pin 23 from the saw blade 3.

The mounting clamp 27 comprises a plastic base member 28 (FIGS. 2 to 5 and 13) accommodated in the miter groove 6, as shown in FIGS. 2 to 5. The base member 28 has a securing device for releasably securing said base member in the miter groove 6 and a clamping device for releasably clamping the flanges 11 and 12 of the guide member 7. The base member 28 is of substantially rectangular parallelepiped configuration, as shown in FIG. 13, having spaced substantially parallel first and second surfaces 29 and 30, respectively (FIGS. 4 and 5), which are the top and bottom surfaces thereof, and spaced substantially parallel third and fourth surfaces 31 and 32, respectively (FIGS. 2, 3 and 5), which are the side surfaces thereof and are substantially perpendicular to said first and second surfaces.

The clamping device of the mounting clamp 27 comprises a pair of spaced substantially parallel bores 33 and 34 formed through the base member 28 from the first surface 29 to the second surface 30 and substantially perpendicular to said surfaces, as shown in FIG. 4. A mounting groove 35 (FIGS. 4 and 13) is formed in the first, or top, surface 29 between the bores 33 and 34, as shown in FIG. 4. A pair of nut holes 36 and 37 are formed in the second, or bottom, surface 30 at the bores 33 and 34, respectively, as shown in FIG. 4.

A pair of nuts 38 and 39 are seated in the nut holes 36 and 37, respectively (FIG. 4), and a pair of square washers 40 and 41 (FIGS. 2, 4 and 13) are coaxially positioned with the bores 33 and 34, respectively, on the first surface 29 of the base member 28 (FIG. 4). A first screw 42 (FIGS. 2, 4, 5 and 13) passes through the square washer 40 at the first surface 29 and through the bore 33 and is threadedly coupled to the nut 38, as shown in FIG. 4. A second screw 43 (FIGS. 2 to 4 and 13) passes through the square washer 41 at the first surface 29 and through the bore 34 and is threadedly coupled to the nut 39, as shown in FIG. 4. The square washers 40 and 41 thus clamp the flanges 11 and 12, respectively, as shown in FIGS. 2 and 4, and are releasably tightenable via the screws 42 and 43.

The securing device of the mounting clamp 27 comprises a slot 44 formed through the base member 28 from the third surface 31 to the fourth surface 42 and opening at the second surface 30, as shown in FIG. 4. A square nut hole 45 (FIGS. 5 and 13) is formed in the base member 28 substantially coaxially with the slot 44 at substantially the center of said slot, substantially equidistantly between the surfaces 31 and 32, and opening at the first and second surfaces 29 and 30, as shown in FIG. 5.

A square nut 46 (FIG. 5) is seated in the square nut hole 45, as shown in FIG. 5, and a securing screw 47 passes through the slot 44 and is threadedly coupled to the square nut 46, as shown in FIG. 5. The screw 47 has a shank with spaced opposite first and second ends 48 and 49, respectively (FIG. 5), and a head 50 (FIGS. 4, 5 and 13) at said second end of said shank at the fourth surface 32 of the base member 28, as shown in FIGS. 4, 5 and 13. The first end 48 of the shank is at the third surface 31 of the base member 28, as shown in FIG. 5. Thus, adjustment of the securing screw 47 secures the base member in the miter groove 6.

In the embodiment of FIGS. 1 to 9 and 13, an axial or central hole 51 (FIGS. 1 and 6) must be made through the workpiece 1 in order to rotatably mount said workpiece on the pivot pin 23, as shown in FIG. 6. The embodiment of FIGS. 10, 11 and 12 is used when it is desired that no hole be made through the center of the workpiece 1. In the embodiment of FIGS. 10 to 12, the pivot pin 23 is replaced by a screw 52 (FIG. 10) which is releasably securable to the guide member 7 at a selected point of the guide groove 8, as is said pivot pin. This is accomplished by any suitable means such as, for example, the nut 24 (FIG. 10) to which the screw 52 is threadedly coupled, as shown in FIG. 10. When the screw 52 is loosely coupled to the nut 24, said screw and nut are freely slidable along the entire length L of the guide member 7. When the screw 52 is tightly clamped to the nut 24, said screw and said nut clamp the lips 25 and 26 and said screw is retained in position until it is loosened in said nut.

In order to rotate the workpiece 1, without a hole therethrough, about the screw 52, a flat or small-altitude cylindrical rotary member 53 (FIGS. 10 to 12) is removably affixed to the undersurface 54 of said workpiece (FIG. 10) by any suitable means such as, for example, screws, nails, pins, or the like 55, 56, 57, 58, 59 and 60 (FIGS. 11 and 12). An axial hole 61 is formed through the rotary member 53 (FIGS. 10 to 12) accommodates the head 62 of the screw 52, as shown in FIG. 10, whereby said rotary member and the workpiece 1 are rotated about said screw or about the pivot pin 23.

A knob 63 of plastic, or any other suitable material (FIGS. 1 to 3 and 6) may be removably affixed to the center of the oversurface 64 of the workpiece 1 (FIGS. 1 to 3 and 6) by any suitable means such as, for example, screws 65 and 66, as shown in FIG. 6. The knob 63 has a coaxial hole 67 (FIG. 6) formed therethrough to accommodate the pivot pin 23. When the knob 63 is affixed to the workpiece 1, said workpiece may be manually rotated about the pivot pin 23, by a user, without exposing the fingers of the user to dangerous proximity with the saw blade 3. The knob 63 has a plurality of projections at its outer cylindrical surface, as shown in the FIGS., to facilitate gripping by the hand of the user.

The workpiece mounting device of the invention is assembled by first threading the #10-32×⅜ inch square nut 46 on the #10-32×9/16 inch hex head screw 47. The nut 46 and screw 47 are slid into the slot 44 of the base member 28 and tightened. The #8-32×½ inch pan head hold-down screws 42 and 43 are then passed through the square washers 40 and 41, respectively, and through the bores 33 and 34 of the base member 28. The #8-32×5/16 inch hex nuts 38 and 39 are then threaded on the screws 42 and 43, respectively, at the bottom of the base member 28.

The support arm 13 is then affixed to the guide member 7 via the fastening member 18. More particularly, the stem 19 of the fastening member 18 is fitted in the guide groove 8 of the guide member 7 at the end 9 thereof and the first and second parts 14 and 15 of the support arm 13 are fitted on the first and second halves 21 and 22, respectively, of said fastening member. The #8-32×5/16 inch hex nut 24 is then slid into the guide groove 8 of the guide member 7. The threaded end of the pivot pin 23 is passed through a round washer 68 (FIG. 6) and threaded into the nut 24. The washer 68 rests on top of the lips 25 and 26 of the guide member 7.

In order to use the workpiece mounting device of the invention with a table saw, the mounting clamp 27 is placed in the miter groove 6 at the center line of the saw blade arbor 2. The mounting clamp 27 is then tightened firmly in place by turning the hex head screw 47 counterclockwise with a 5/16 inch open end wrench.

The guide member 7 is then placed in the mounting groove 35 of the base member 28 and adjusted as follows. For circles up to 12 inches in diameter, the pivot pin 23 should be positioned as close as possible to the support arm 13 and tightened securely. The guide member 7 is adjusted in the mounting clamp 27 to obtain the desired radius and the hold-down screws 42 and 43 are tightened securely. For circles larger than 12 inches in diameter, the guide member 7 and the support arm 13 are positioned so that the support arm is next-adjacent the mounting clamp 27. The hold-down screws 42 and 43 are then tightened securely. The pivot pin 23 is the positioned, as desired, in the guide groove 8, to attain the desired radius, and is tightened securely.

A ¼ inch diameter hole should be drilled through the center of a workpiece ¼ inch thick, or less. A 17/64 inch diameter hole is drilled through the center of a workpiece thicker than ¼ inch. If it is desired to avoid the drilling of a hole through the workpiece, the pivot pin 23 may be cut, or shortened in length, or the rotary member 53 may be affixed to the undersurface of the workpiece, whereby said workpiece is rotated via the hole 61 through said rotary member.

The workpiece is then placed on the pivot pin 23 and the saw blade 3 is adjusted so that it cuts only 1/16 inch for each pass or revolution of the workpiece. It is important that the workpiece be rotated slowly in counterclockwise direction. The user should press down on the workpiece only where it lies directly over either the guide member 7 of the support arm 13, while rotating the workpiece. The height of the saw blade 3 should be readjusted 1/16 inch after each pass.

Circles smaller than 6 inches in diameter should be cut with the aid of the knob 63. This assures the safety of the user by keeping his fingers from being too close to the saw blade 3. The knob 63 is secured to the center of the oversurface of the workpiece, as hereinafter described, by the #6×⅜ inch pan head wood screws 65 and 66.

When a circle larger than 24 inches in diameter is to be cut, a support should be affixed to the bottom of the guide member 7. A board approximately ¾×¾ inch should be cut to the exact length between the bottom of the guide member 7 and the floor. The board should be affixed via a #8×¾ inch pan head wood screw through a hole formed through the center of a fastening member 90.

A piece of ¼ inch thick stock should be clamped across the front of the table saw top for workpiece stability during rotation.

The workpiece mounting device of the invention is used with a band saw in the same manner as hereinbefore described, with the exception that the saw blade adjustment step is deleted.

The workpiece mounting device of the invention is used with a radial arm saw in the following manner.

The ripping guide is removed from the table top when large circles are to be cut. The guide member 7 and support arm 13 are positioned at the middle of the table top with the support arm 6 inches away from the saw blade. The guide member 7 is affixed to the table top via two #8×¾ inch pan head wood screws, which are passed through the holes in fastening members 18 and 19. The pivot pin 23 is then positioned in the guide groove 8 for a desired radius, and tightened securely.

A ¼ inch diameter hole is drilled through the center of the workpiece, if said workpiece is ¼ inch thick or less. A 17/64 inch diameter hold is drilled through the center of a workpiece more than ¼ inch thick. The radial arm saw blade and motor are positioned so that the center of the arbor is in line with the guide member 7. The assembly is then locked in this position.

The workpiece is then placed on the pivot pin 23 and the saw blade is adjusted so that it cuts only 1/16 inch for each pass or revolution of the workpiece. The workpiece is manually rotated slowly, by the user, in a clockwise direction. The saw blade height is readjusted 1/16 inch after each pass. When circles having diameters greater than 24 inches are to be cut, a ¼ inch thick piece of stock should be clamped on the front edge of the table saw top for workpiece stability during rotation.

While the invention has been described by means of specific examples and in specific embodiments, I do not wish to be limited thereto, for obvious modifications will occur to those skilled in the art without departing from the spirit and scope of the invention.

I claim:

1. a device for mounting a workplace on the table of a motor-driven saw blade to cut a circle of a selected diameter in the workpiece, said table having a planar work surface in a miter groove formed therein and said saw blade being mounted in operative proximity with said work surface in spaced relation with said miter groove, said device comprising
   a guide member having a linearly extending guide groove formed therein;
   a pivot pin guided in said guide groove in substantially perpendicular relation with said guide member and releasably securable to said guide member at a selected point of said guide groove;
   a mounting clamp for releasably securing said guide member to the miter groove of the table of a motor-driven saw blade in a manner whereby said guide member abuts the planar work surface of said table with said guide groove substantially prependicular to said miter groove and said pivot pin extending substantially perpendicularly to said work surface at a selected distance from said saw blade so that a workpiece totatably mounted on said pivot pin substantially parallel to said work suface is cut in a circle by said saw blade as said workpiece is rotated, the diameter of said circle being twice the distance of said pivot pin from said saw blade; and
   wherein said guide member has a length and flanges extending along its length, and said mounting clamp comprises a base member accommodated in said miter groove and having securing means for releasably securing said base member in said miter groove and clamping means for releasably clamping the flanges of said guide member.

2. A device for mounting a workpiece as claimed in claim 1, wherein said guide member has spaced opposite first and second ends and a support arm at the first end thereof extending substantially perpendicularly to said guide groove.

3. A device for mounting a workpiece as claimed in claim 1, wherein said workpiece has an undersurface, and further comprising a small-altitude cylindrical rotary member having an axial hole formed therethrough and means for affixing said rotary member coaxially to the undersurface of said workpiece whereby the hole through said rotary member accommodates said pivot pin.

4. A device for mounting a workpiece as claimed in claim 1, wherein said workpiece has an oversurface, and further comprising a knob and means for affixing said knob coaxially to the oversurface of said workpiece whereby said workpiece is manually rotatable at a distance from said saw blade via said knob.

5. A device for mounting a workpiece as claimed in claim 1, wherein the base member of said mounting clamp is of substantially rectangular parallelepiped configuration having spaced substantially parallel first and second surfaces and spaced substantially parallel third and fourth surfaces substantially perpendicular to said first and second surfaces and said clamping means comprises a pair of spaced substantially parallel bores formed through said base member from the first to the second surface and substantially perpendicular thereto, a mounting groove formed in said first surface between said bores, a pair of square washers, a pair of nut holes formed in said second surface at said bores, a pair of nuts seated in said nut holes and a pair of screws each passing through a corresponding one of said square washers at said first surface and through a corresponding one of said bores and being threadedly coupled to a corresponding one of said nuts whereby said square washers clamp said flanges and are releasably tightenable via said screws.

6. A device for mounting a workpiece as claimed in claim 1, wherein the base member of said mounting clamp is of substantially rectangular parallelepiped configuration having spaced substantially parallel first and second surfaces and spaced substantially parallel third and fourth surfaces substantially perpendicular to said first and second surfaces, said clamping means is mounted on said first surface and said securing means comprises a slot formed through said base member from the third to the fourth surface and opening at said second surface, a square nut hole formed in said base member substantially coaxially with said slot at substantially the center thereof and opening at said first and second surfaces, a square nut seated in said square nut hole and a securing screw passing through said slot, threadedly coupled to said square nut and having a shank with spaced opposite first and second ends and a head at the second end of said shank at said fourth surface of said base member, the first end of said shank being at said third surface of said base member whereby adjustment of said securing screw secures said base member in said miter groove.

7. A device for mounting a workpiece as claimed in claim 2, wherein said support arm of said guide member has first and second identical parts with linearly extending grooves formed therein, and further comprising a substantially T-shaped fastening member having a stem removably seated in said guide groove at said first end of said guide member and a head extending substantially perpendicularly to said stem and having a first half extending from one side of said stem and removably seated in the groove of the first part of said support arm and a second half extending from the opposite side of said stem and removably seated in the groove of the second part of said support arm.

* * * * *